United States Patent [19]

Irie et al.

[11] Patent Number: 4,673,794
[45] Date of Patent: Jun. 16, 1987

[54] ELECTRON BEAM WELDING METHOD

[75] Inventors: Hirosada Irie; Susumu Tukamoto, both of Yokohama, Japan

[73] Assignee: National Research Institute for Metals, Tokyo, Japan

[21] Appl. No.: 844,019

[22] Filed: Mar. 25, 1986

[30] Foreign Application Priority Data

May 10, 1985 [JP] Japan .................................. 60-98010
May 10, 1985 [JP] Japan .................................. 60-98011

[51] Int. Cl.[4] ............................................. B23K 15/00
[52] U.S. Cl. ...................... 219/121 ED; 219/121 ER; 219/121 ET; 250/396 ML
[58] Field of Search ................ 219/121 EC, 121 ED, 219/121 ER, 121 ES, 121 ET; 250/492.22, 396 ML

[56] References Cited

U.S. PATENT DOCUMENTS

| | | | |
|---|---|---|---|
| 2,976,457 | 3/1961 | Reisner | 250/396 ML X |
| 3,387,241 | 6/1968 | Audoin et al. | 250/396 ML X |
| 3,566,071 | 2/1971 | Matchett et al. | 219/121 ED |
| 3,763,345 | 10/1973 | Stohr | 219/121 ED |
| 3,831,121 | 8/1974 | Oster | 250/396 ML X |
| 3,887,784 | 6/1975 | Alais et al. | 219/121 ET X |
| 4,051,381 | 9/1977 | Trotel | 250/492.22 |
| 4,075,488 | 2/1978 | Okayama et al. | 250/492.22 |
| 4,223,200 | 9/1980 | Möench et al. | 219/121 EC X |

FOREIGN PATENT DOCUMENTS 0147856 9/1982 Japan .......................... 250/396 ML

*Primary Examiner*—C. L. Albritton
*Attorney, Agent, or Firm*—Wenderoth, Lind & Ponack

[57] ABSTRACT

For carrying out electron beam welding, there is formed by means of a magnetic or electric field set up by an even number of at least two magnetic poles or electrodes, an electron beam, the pattern of which has elliptical or similar shaped cross sections. Electron beam welding is performed using such an electron beam. The direction of the major axis of the cross section of the electron beam at the surface of the material being welded and the direction of the major axis of the cross section of the electron beam at the bottom of the beam cavity, i.e., the root portion, are at right angles to each other.

3 Claims, 5 Drawing Figures

ELECTRON BEAM WELDING METHOD

BACKGROUND OF THE INVENTION

1. Field of the Invention

This invention relates to an electron beam welding method and, more specifically, to an electron beam welding method that uses a modified electron beam pattern.

2. Description of the Prior Art

The electron beam welding method is characterized by the fact that in view of the high power density there can be obtained a weld bead having a narrow width and a deep penetration.

On the other hand, the behavior of the molten metal becomes very complicated, since the welding must be carried out while forming a narrow elongated electron beam cavity for obtaining a deep panetration, and this results in the formation of its peculiar defects.

Specifically, in the electron beam welding method, a beam cavity is formed at the front side in the welding direction, while the molten metal accumulates at the rear side. The molten metal is ejected externally of the beam cavity by the pressure of the metal vapor, followed by an inflow of the molten metal from the outside of the beam cavity. Now, if this ejection and inflow of the molten metal is repeated periodically in a suitable manner, the welding can be favorably carried out.

For example, if the power density of the beam at the root portion is low or the opening of the beam cavity at the surface of the material being welded is small, the molten metal does not flow out properly. Hence, the already solidified wall is melted by the accumulated molten metal in the beam cavity to cause the formation of depressions at intermediate points of the beam cavity, with the consequence that voids, i.e., porosities, or various solidification cracks are formed.

On the other hand, if the energy density of the beam at the root portion is too high, sharp spikes are formed at the root portion which become the cause of poor melt bonding, i.e., coldshuts, as well as the formation of voids, i.e. root porosities. Hence, there has been the drawback that the strength of the weld can not be increased.

As means of resolving the aforesaid porosities and formation of solidification cracks, there has been suggested a method of welding which involves carrying out the welding while oscillating the electron beam in the welding direction or a direction perpendicular thereto. In the case of the method where the electron beam is oscillated in the welding direction, there are, however, such drawbacks as that violent sputtering takes place as a result of the electron beam reheating the molten metal of high temperature and that sharp spikes are formed at the root portion. On the other hand, in the case of the method in which the welding is performed while oscillating the electron beam in a direction perpendicular to the welding direction, there is the drawback that the bead width spreads and the penetration cannot be made deep.

The electron beam welding method has however the advantage that, as compared with the other welding methods, the diameter of the heat source is small and the power density is remarkably high, with the consequence that it is a welding method of high efficiency that can weld thick plates in a single step.

SUMMARY OF THE INVENTION

The inventors of this invention engaged in extensive research with the view of resolving the problems such as discussed hereinbefore. This research led to the discovery that the aforesaid defects can be prevented and the welding can be performed in a satisfactory manner without impairing the penetration depth, if the flow of the molten metal is controlled by forcibly modifying the pattern of the electron beam by means of a magnetic or electric field.

There is thus provided in accordance with this invention an electron beam welding method which comprises forming by means of a magnetic or electric field set up by an even number of at least two magnetic poles or electrodes, an electron beam of high power density, the pattern of which beam has in a first zone in the axial direction of the beam elliptical or similar shaped cross sections having a major axis and a minor axis, and in a second zone in the axial direction of the beam a cross section having a major axis extending in a direction perpendicular to the major axis of said first-named cross section, and a minor axis; and placing a material to be welded in a position relative to said electron beam such that the top surface of the material to be welded is in said first zone and the root portion thereof is in said second zone.

According to this invention, the electron beam impinges the top surface of the material to be welded at that portion having the major and minor axes. Hence, the opening of the beam cavity can be made large, with the consequence that the molten metal flows out smoothly without accumulating at intermediate points of the beam cavity. The formation of depressions at intermediate points of the solidified wall can thus be prevented. Hence, it is possible to prevent say porosities and solidification cracks.

On the other hand, since there is a substantial drop in the power density at the root portion, the melting of the metal by the electron beam becomes milder, and in the case of partial penetration welding sharp spikes and cold shuts can be checked. And in the case of full penetration welding a beautiful root surface bead can be formed.

An object of this invention, therefore, is to provide an electron beam welding method by which desirable welds can be obtained. Another object is to provide an electron beam welding method which, as a result having promoted the outflow of the molten metal from the beam cavity, can prevent the formation of depressions at intermediate points of the beam cavity and thus prevent porosities and formation of solidification cracks. A further object is to provide an electron beam welding method that can give welds free from sharp spikes and cold shuts or provide welds having a beautiful root surface bead.

DESCRIPTION OF THE PREFERRED EMBODIMENTS

Figure 1:
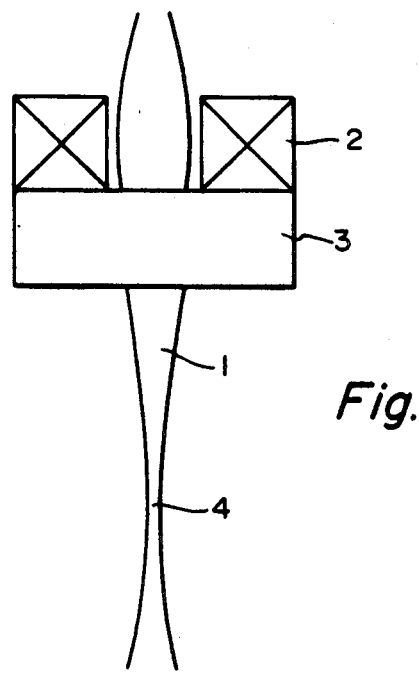
FIG. 1 is a schematic drawing for explaining the method in accordance with the present invention.

As shown in FIG. 1, an electron beam configuration controlling device 3 made up of an even number of at least two magnetic poles or electrodes is disposed below focus lens 2. The configuration of the electron beam 1 in sections perpendicular to the axis of the electron beam 1 is controlled by using the device 3, and the electron beam whose configuration has been so controlled is used in carrying out the welding. The numeral 4 in the figure shows the initial focal point when the electron beam configuration controlling device is not used.

Figure 2:
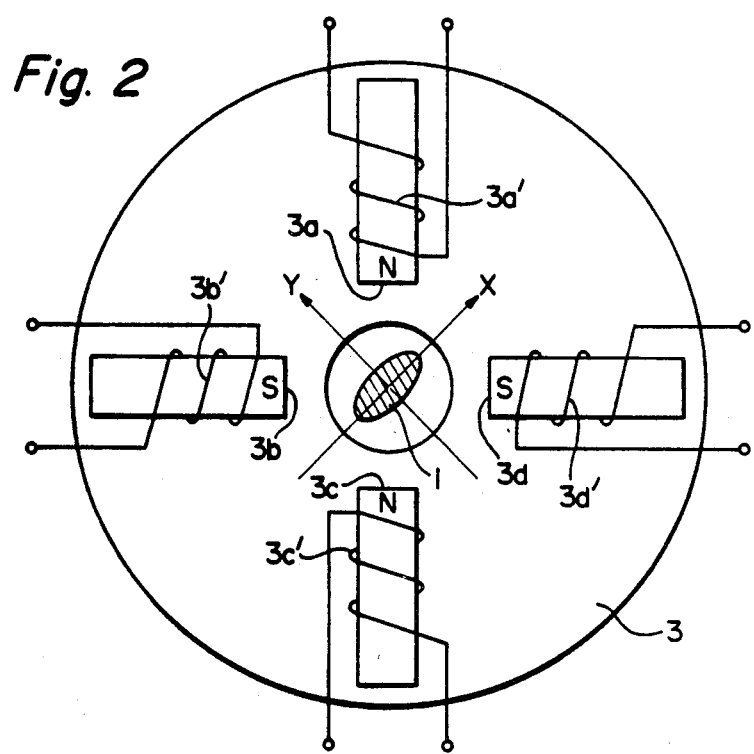
FIG. 2 is a schematic plan of an apparatus for forming the electron beam having the pattern used in the method in accordance with the present invention.

In FIG. 2, there is shown one mode of the electron beam configuration controlling device 3. The magnetic field that modifies the configuration of the electron beam is set up by the four magnetic poles 3a, 3b, 3c and 3d that are disposed symmetrically at 90-degree angles from one another, on excitation of the four excitation coils 3a', 3b', 3c' and 3d'. The opposing magnetic poles 3a and 3c, and 3b and 3d possess the same polarity and magnetic potential.

Figure 3:
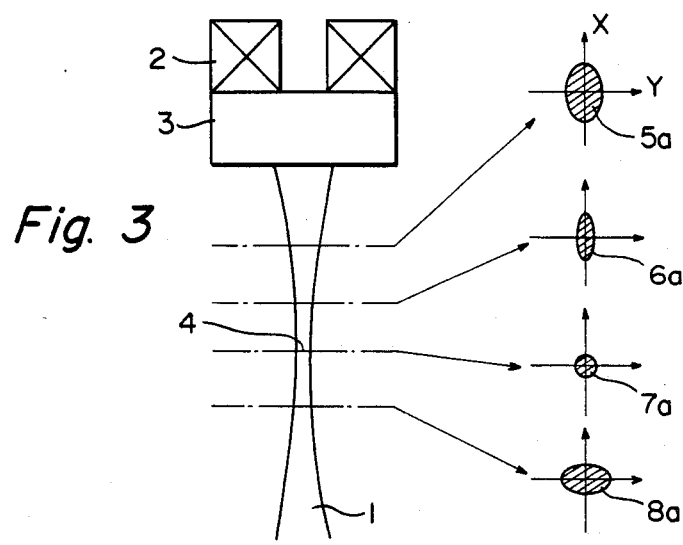
FIG. 3 is a schematic view of an apparatus for forming the electron beam having the pattern used in this invention and views in cross section of the electron beam at the several positions in the axial direction.

Now, let magnetic poles 3a and 3c be north poles, and magnetic poles 3b and 3d be south poles, then a divergent force acts in the direction of the X axis, while a convergent force acts in the direction of the Y axis. Now, if the current passing to the focus lens 2 is set at a proper value and the current to the excitation coils 3a', 3b', 3c' and 3d' of the electron beam configuration controlling device 3 is also set at a proper value, then, as shown in FIG. 3, the electron beam shown by 5a, 6a, 7a and 8a at sections perpendicular to the axis of the electron beam at the several positions in the axial direction of the electron beam becomes at that side of the initial focal point 4 (the focal point when not using the electron beam configuration controlling device 3) proximal to the electron beam configuration controlling device, i.e. in the first zone, of elliptical or similar configuration having a major axis lying in the direction of the X axis as shown by 5a and 6a; whereas, on the opposite side, i.e., the second zone, it becomes of elliptical or similar configuration having a major axis lying in the direction of the Y axis as shown by 8a.

Specifically, with the initial focal point 4 (the focal point when not using the electron beam configuration controlling device 3) as the boundary, there can be formed at both sides thereof at sections perpendicular to the electron beam axis the electron beam shown by 5a, 6a and 8a of elliptical or similar configuration, wherein the major axis of the electron beam shown by 5a and 6a is at right angles to that of the electron beam shown by 8a.

The electron beam shown by 5a, 6a, 7a and 8a having such a configuration can also be obtained by using an electric field instead of a magnetic field. Specifically, the electron beam shown by 5a, 6a, 7a and 8a or of similar configuration can be obtained by using electrodes instead of the magnetic poles 3a, 3b, 3c and 3d.

In carrying out the first and second embodiments, an electron beam formed in this manner is used in performing the welding, the initial focal point 4, i.e., the focal point when not using the electron beam configuration controlling device 3, being adjusted so that it is positioned in the middle part of the depth of the electron beam cavity.

Figure 4:
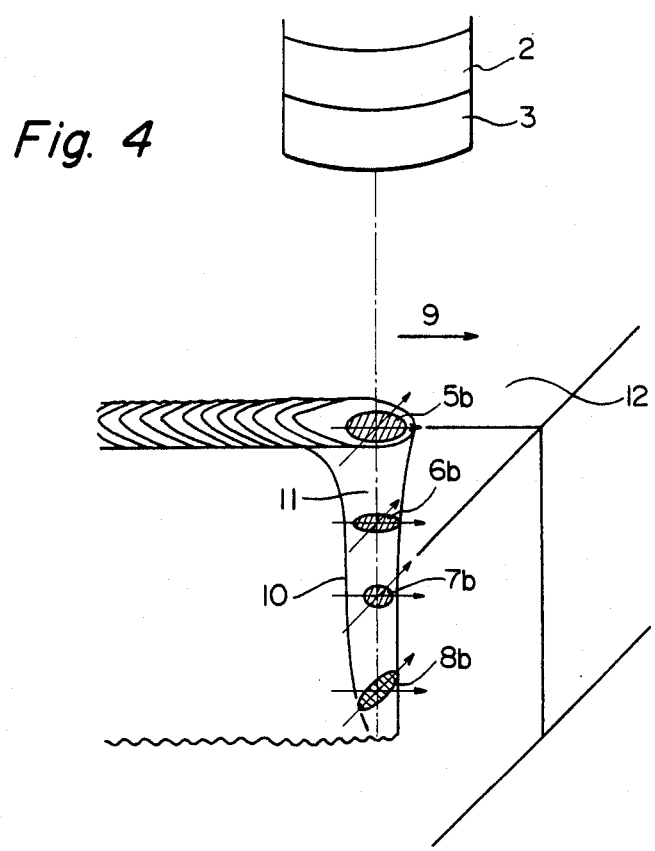
FIG. 4 is schematic view showing a welding method in accordance with the first embodiment of the invention.

FIG. 4 shows schematically the method in accordance with the first embodiment of this invention. According to this method, the welding is carried out while adjusting the electron beam, as shown in FIG. 4, so that the major axis of the elliptical configuration of the electron beam in the neighborhood of the surface of the material being welded 12, as shown by 5b, lies in the welding direction as shown by arrow 9; whereas in the penetration root portion the major axis, as shown by 8b, lies in a direction perpendicular to the welding direction. In this case, the electron beam cavity 11 in the neighborhood of the surface of the material being welded 12 becomes enlarged in the welding direction. Hence, the molten metal flows out smoothly from the inside of the electron beam cavity 11 and thus does away with the formation of local depressions of the solidified wall 10 thereby preventing the formation of porosities and solidification cracks. On the other hand, in the neighborhood of the root portion, there is essentially a drop in the power density as a result of the enlargement of the electron beam 8b in a direction perpendicular to the welding line, with the consequence that the process of melting the metal by the electron beam becomes milder. Hence, the formation of spikes and cold shuts can be checked in the case of partial penetration welding, and the formation of a beautiful root surface bead becomes possible in the case of full penetration welding.

Figure 5:
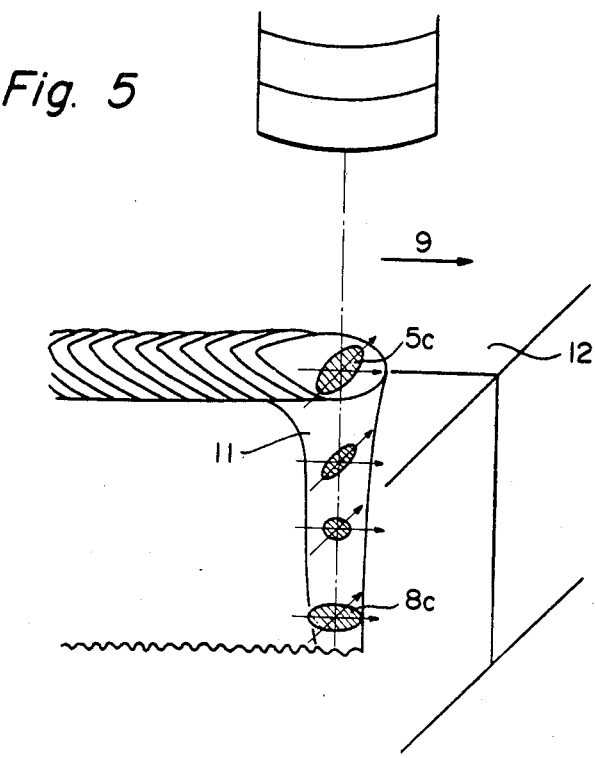
FIG. 5 is a schematic view showing a welding method in accordance with the second embodiment of the invention.

FIG. 5 shows schematically the method in accordance with the second embodiment of this invention. According to this method, the welding is performed while adjusting the electron beam, as shown in FIG. 5, so that the major axis of the elliptical configuration of the electron beam in the neighborhood of the surface of the material being welded 12, as shown by 5c, lies in a direction at right angles to the welding direction, as shown by arrow 9. In this case the electron beam cavity 11 is enlarged by means of the electron beam 5c in a direction perpendicular to the welding direction. Thus, as in the case with the first embodiment, the molten metal flows out smoothly, and it becomes possible to prevent the formation of such defects as porosities and solidification cracks. Moreover, in this embodiment, since the electron beam in the neighborhood of the root portion shown by 8c becomes of an elliptical configuration having its major axis lying in the welding direction, there is practically no reduction in the penetration depth as compared with the known method wherein the electron beam is oscillated in a direction perpendicular to the welding direction. Furthermore, since the electron beam shown by 5c in the neighborhood of the surface of the material being welded spreads out in a direction perpendicular to the welding direction, a beautiful top surface bead can be formed.

While typical embodiments have been shown illustrating the method of performing welding using an electron beam whose configuration has been controlled, it is to be understood that other embodiments can be carried out with similar results by using the electron beam shown by 5a, 6a, 7a and 8a in FIG. 3.

In the above-described embodiments, magnetic fields having a given intensity and direction were set up by actuating four magnetic poles with a direct durrent, and these were used as described hereinbefore in modifying the electron beam patterns. It is also possible to modify the electron beam patterns by using instead of the direct current an alternating current for actuating say the magnetic poles to set up magnetic fields having variable intensities and directions.

COMPARATIVE EXAMPLE 1 and EXAMPLES 1 and 2

The electron beam welding in accordance with this invention was carried out using an electron beam configuration controlling device that uses four magnetic poles as shown in FIG. 2. By way of comparison, the welding was also performed by the conventional method.

SM50A steel was used as the test material, and the experiments were carried out under the following conditions: accelerating voltage: 50 kV, electron beam current: 200 mA, welding speed: 25 cm/min., focus lens current: 4.98 A, object distance: 175 mm. The results obtained are shown in Table 1.

Bead 1 is that obtained by the conventional method; bead 2 is that obtained by the welding method shown in FIG. 4; and bead 3 is that obtained by the welding method shown in FIG. 5.

TABLE 1

| Bead | Method | Ampere turns per coil (AT) | Depth of penetration (mm) | State of occurrence of defects |
|---|---|---|---|---|
| 1 | Conventional | — | 36 | Occurrence of porosities, longitudinal cracks and horizontal cracks |
| 2 | Electron beam configuration controlled (First method) | 630 | 38 | No defects; effect of checking spikes great |
| 3 | Electron beam configuration controlled (Second method) | 630 | 35 | No defects; top surface bead beautiful |

As apparent from these results, local depressions occurred in the case of the conventional method, and there was the occurrence of such defects as porosities and longitudinal and horizontal cracks. On the other hand, there was virtually no reduction in the depth of penetration in both cases of the invention method, and a stable solidified wall was formed. The defects of the conventional method can thus be prevented. Furthermore, the effect of preventing spikes was great in the case of the first welding method, and in the case of the second welding method there was the effect that a beautiful top surface bead can be formed.

As many apparently widely different embodiments of this invention may be made without departing from the spirit and scope thereof, it is to be understood that the invention is not limited to the specific embodiments thereof except as defined in the appended claims.

What is claimed is:

1. An electron beam welding method which comprises forming by means of a magnetic or electric field set up by an even number of at least two magnetic poles or electrodes, an electron beam of high power density, the pattern of which beam has in a first zone in the axial direction of the beam an elliptical or similar shaped cross section having a major axis and a minor axis and in a second zone in the axial direction of the beam a cross section having a major axis extending in a direction perpendicular to the major axis of said first-named cross section, and a minor axis; and placing a material to be welded in a position relative to said electron beam such that the surface of the material to be welded is in said first zone and the root portion of the weld cavity formed by said electron beam is in said second zone.

2. The method of claim 1 wherein the major axis of the cross section in said first zone extends in the welding direction.

3. The method of claim 1 wherein the major axis of the cross section in said first zone is perpendicular to the welding direction.

* * * * *